United States Patent Office 3,449,110
Patented June 10, 1969

3,449,110
HERBICIDAL MIXTURE OF A 4,4'-BIPYRIDYLIUM SALT AND THIOUREA
Stephen Henry Crowdy, Southampton, and John Alan Farrington and Roger Sidney Lockington Jeater, Bracknell, England, assignors to Imperial Chemical Industries Limited, London, England, a corporation of Great Britain
No Drawing. Continuation-in-part of application Ser. No. 362,964, Apr. 27, 1964. This application Jan. 11, 1968, Ser. No. 697,025
Claims priority, application Great Britain, Apr. 29, 1963, 16,773/63
Int. Cl. A01n 9/22, 5/00
U.S. Cl. 71—92                                    5 Claims

ABSTRACT OF THE DISCLOSURE

A herbicidal composition comprising a synergistically effective mixture of a 4,4'-bipyridylium salt and thiourea.

---

This application is a continuation-in-part of Ser. No. 362,964, filed Apr. 27, 1964.

This invention relates to herbicidal compositions and more particularly to compositions containing a herbicidal 4,4'-bipyridylium salt and an additional chemical to improve its herbicidal action.

We have found that a surprising increase in the toxic effects of a bipyridylium salt, which could not have been predicted, can be secured when the salt is used in conjunction with thiourea.

According to this invention therefore we provide a concentrated aqueous herbicidal composition containing from 10–80% by weight of a synergistically effective mixture of a 4,4'-bipyridylium salt and thiourea.

Preferably the composition includes a cationic or non-ionic surface active agent to facilitate the dispersion of the mixture of salt and thiourea. Thiourea itself is substantially non-herbicidal. Surprisingly, however, the cumulative effect of using this material with the 4,4'-bipyridylium salt is much greater than the expected additive effect of the components. In other words, the thiourea somehow synergistically supplements the herbicidal activity of the bipyridylium salt. The mechanism by which this happens is not understood but there appears to be some highly unusual coaction between the two components which brings about the unexpected degree of herbicidal activity which has been observed.

The proportion of thiourea to be used in the concentrated composition may be varied. Thus, from 0.01 to 20 parts by weight per part of bipyridylium salt may be used, although from 0.01 to 5 parts by weight are generally sufficient. However, larger or smaller quantities may sometimes be desirable.

The thiourea may be used to good effect with any of the herbicidally active 4,4'-bipyridylium salts. Preferred salts are those wherein both nitrogen atoms of the bipyridyl nucleus bear as a quaternising group a substituted or unsubstituted alkyl group having from 1 to 20 and preferably from 1 to 4 carbon atoms. Substituted alkyl groups may contain as a substituent an amino group, a carbamoyl, carbonyl alkoxy group, a hydroxy group or a phenyl group. One or more hydrogen atoms attached to the nitrogen atoms of the amino or carbamoyl group may also be substituted preferably by a lower alkyl group and the nitrogen atom of the amino or carbamoyl group may itself form part of a heterocyclic ring. The following 4,4'-bipyridylium salts give especially good results with the thiourea.

1,1'-dimethyl-4,4'-bipyridylium dichloride
1,1'-dimethyl-4,4'-bipyridylium di(methylsulphate)
1,1'-dimethyl-4,4'-bipyridylium-di-p-toluene-sulphonate
1,1'-di-dodecyl-4,4'-bipyridylium-di-p-toluene-sulphonate
1,1'-di(2-hydroxyethyl)-4,4'-bipyridylium dichloride
1,1'-di(diethyl-carbamoyl-methyl)-4,4'-bipyridylium dichloride
1,1'-di(di-isopropylcarbamoyl methyl)-4,4'-bipyridylium dichloride
1,1'-di-carboxymethyl-4,4'-bipyridylium dichloride
1,1'-di(4-methylpiperidino carbonyl methyl)-4,4'-bipyridylium dichloride
1,1'-di(3,5-dimethylmorpholino carbonyl methyl)-4,4'-bipyridylium dichloride The majority of the bipyridylium salts listed above are chlorides in which form they are most commonly encountered. However, any other salt may be used, for example the bromide, fluoride, iodide, sulphate, methylsulphate, nitrate, phosphate, thiocyanate, chromate, acetate, oxalate, benzoate, borate or cyanate salt.

As indicated, the surface active agent, if employed, may be either cationic or non-ionic in character, although the non-ionic surface active agents are to be preferred, especially those obtained by condensing ethylene oxide with substances containing a hydrogen atom capable of reacting with ethylene oxide. Preferred surface active agents include condensation products of ethylene oxide with an alkylated phenol, for example octyl phenol and nonyl phenol; cetyl alcohol, oleyl alcohol, sorbitan monolaurate and higher aliphatic amines containing from 6 to 20 carbon atoms. Anionic wetting agents may also be used, for example sodium dodecyl benzene sulphonate and butyl naphthalene sulphonate. However, such agents sometimes adversely affect the herbicidal properties of a bipyridylium salt or have other adverse effects on the properties of the concentrated composition. In general therefore, if an anionic surface active agent is to be used as a non-ionic surface active agent should also be present and in a major amount with respect to the anionic surface active agent. The amount of surface active agent which can be used may vary according to the nature of the other ingredients of the composition. In general from 0.01 to 10.0% by weight of the composition is sufficient although especially good results are generally obtained with from 1 to 6%.

The compositions tend to be corrosive and therefore advantage may be gained by including a corrosion inhibitor. Suitable inhibitors include water soluble phosphates which in aqueous solution liberate $H_2PO_4^-$ ions, examples of which are di-potassium hydrogen phosphate and sodium dihydrogen phosphate. Other inhibitors include sodium molybdate, metaborate, nitrite and benzoate. The composition may be prepared by mixing the separate ingredients in any order. Thus, the thiourea may be mixed with the surface active agent after which the mixture is added to an aqueous solution of the bipyridylium salt. Finally other ingredients including for example the corrosion inhibitor may be added.

This invention is illustrated by the following example:

Example 1

This example illustrates a concentrated composition containing as a regulator thiourea which is itself substantially non-herbicidal.

| | Weight percent |
|---|---|
| 1,1-di(2-hydroxyethyl)-4,4'-bipyridylium dichloride | 20.0 |
| Thiourea | 10.0 |
| Surface active agent comprising a condensation product of ethylene oxide and amines derived from soya beans | 5.0 |
| Water | 65.0 |
| | 100.0 |

The unexpected synergistic activity demonstrated by mixtures of 4,4'-bipyridylium salt and thiourea according to the invention is demonstrated by the following test data, the paraquat dichloride referred to therein being 1,1'-dimethyl-4,4'-bipyridylium dichloride:

Young "cocksfoot" (*Dactylis glomerata*) plants were sprayed in the glasshouse with paraquat dichloride and the thiourea alone and with mixtures of paraquat dichloride and the thiourea. The solutions were sprayed at 100 gallons per acre and contained 0.1% of Agral 90 as a wetting agent. There were 4 replicates per treatment. The resultant damage to the plants was assessed visually, relative to controls, four weeks later and the results in the tables below were expressed in terms of the percentage amount of damage, where 0=no effect and 100=complete kill. The synergistic effect of mixtures of paraquat with the thiourea at 1 lb. per acre was calculated by subtracting from the actual test result (A) the effect (E) which would have been expected from an addition of the effects of paraquat (P) and the regulator compound (X) when applied separately. The expected effect was calculated from the formula:

$$E = P + \frac{(100-P)X}{100}$$

(after Finney, D. J., "Probit Analysis" 2nd edition Cambridge University Press 1952).

RESULTS

| | |
|---|---|
| P—Effect of paraquat applied alone at 1/25 lb./acre | 51 |
| A—Effect of paraquat at 1/25 lb./acre plus thiourea at 1 lb./acre | 70 |
| X—Effect of thiourea alone at 1 lb./acre | 3 |
| E—Effect expected from paraquat plus thiourea | 52.5 |
| A–E—Synergistic effect | 17.5 |

The compositions of the invention may be used against a wide variety of weed species. Representative examples of weeds which may be effectively treated include emerged grasses, including knotgrass (*Polygonum aviculare*), wild oats (*Avena fatua*), mayweeds (*Anthemis cotula* and *Tripleurospermum maritinum* spp. *inodrum*), fumitory (*Fumaria officinalis*), speedwells (*Veronica* spp.) and charlock (*Sinapis arvensis*).

These weeds or other undesired growing vegetation may be treated directly with the concentrated compositions of the invention, although in the usual case the compositions are diluted with further amounts of water to give a concentration of, for example, 0.1% to 5% by weight of the synergistic mixture.

What we claim is:
1. A herbicidal composition comprising a synergistically effective mixture of a 4,4'-bipyridylium salt and thiourea.
2. A concentrated herbicidal composition containing from 10 to 80% by weight of a mixture of a 4,4'-bipyridylium salt and thiourea.
3. A concentrated herbicidal composition according to claim 2 in which the 4,4'-bipyridylium salt is a 1,1'-dimethyl-4,4'-pyridylium salt.
4. A concentrated herbicidal composition according to claim 2 including a cationic or non-ionic surface-active agent.
5. A herbicidal method for treating undesired growing vegetation which comprises applying thereto a synergistically effective mixture of a 4,4'-bipyridylium salt and thiourea.

References Cited

UNITED STATES PATENTS

| | | | |
|---|---|---|---|
| 2,258,291 | 10/1941 | Jones | 71—99 X |
| 2,258,292 | 10/1941 | Jones | 71—99 X |
| 2,972,528 | 2/1961 | Brian et al. | 71—92 |
| 3,150,954 | 9/1964 | Wheeler | 71—92 |
| 3,340,041 | 9/1967 | Homer et al. | 71—94 |

JAMES O. THOMAS, Jr., *Primary Examiner.*

U.S. Cl. X.R.

71—99